(12) United States Patent
Sumikawa et al.

(10) Patent No.: US 12,073,735 B2
(45) Date of Patent: Aug. 27, 2024

(54) DRIVING SUPPORT APPARATUS

(71) Applicant: SUBARU CORPORATION, Tokyo (JP)

(72) Inventors: Ryuichi Sumikawa, Tokyo (JP); Takeshi Torii, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 341 days.

(21) Appl. No.: 17/481,985

(22) Filed: Sep. 22, 2021

(65) Prior Publication Data

US 2022/0101752 A1 Mar. 31, 2022

(30) Foreign Application Priority Data

Sep. 28, 2020 (JP) ................... 2020-162296

(51) Int. Cl.
*G09B 19/16* (2006.01)
*B60W 40/00* (2006.01)
*B60W 40/10* (2012.01)
*G06Q 10/00* (2023.01)
*G07C 5/00* (2006.01)
*G07C 5/08* (2006.01)
*G09B 19/00* (2006.01)

(52) U.S. Cl.
CPC ......... *G09B 19/167* (2013.01); *G07C 5/0833* (2013.01)

(58) Field of Classification Search
CPC .... G09B 19/167; G09B 19/00; G07C 5/0833; G07C 5/00; B60W 40/00; B60W 40/10; B60W 40/105; B60W 2300/126; B60W 2300/4046; G06Q 10/00; G06Q 10/04
See application file for complete search history.

(56) References Cited

U.S. PATENT DOCUMENTS

| 9,754,425 B1* | 9/2017 | Iqbal | G07C 5/008 |
| 10,157,423 B1* | 12/2018 | Fields | G05D 1/0278 |
| 10,373,257 B1* | 8/2019 | Iqbal | G06Q 30/0207 |
| 10,817,891 B1* | 10/2020 | Hakimi-Boushehri | G06Q 30/0224 |
| 11,798,089 B1* | 10/2023 | Iqbal | G06Q 30/0207 |
| 2008/0243558 A1* | 10/2008 | Gupte | G06Q 40/08 340/576 |
| 2009/0222338 A1* | 9/2009 | Hamilton, II | G06Q 30/02 705/14.1 |

(Continued)

FOREIGN PATENT DOCUMENTS

| JP | 2012-198344 A | 10/2012 |
| JP | 2013-191230 A | 9/2013 |
| JP | 2017-062690 A | 3/2017 |

OTHER PUBLICATIONS

Notice of Reasons for Refusal received in corresponding Japanese Patent Application No. 2020-162296, dated May 14, 2024.

*Primary Examiner* — Yonel Beaulieu

(74) *Attorney, Agent, or Firm* — Rimon P.C.

(57) ABSTRACT

A driving support apparatus includes a controller. While the vehicle is driving, the controller is configured to obtain data indicating behavior of a body of a vehicle and output a certain sound based on information indicating stability of the behavior determined from the obtained data. Every time the vehicle drives a predetermined segment, the controller is configured to output a reward sound in accordance with the stability of the behavior in the predetermined segment.

19 Claims, 7 Drawing Sheets

(56) References Cited

U.S. PATENT DOCUMENTS

| | | | |
|---|---|---|---|
| 2014/0113619 A1* | 4/2014 | Tibbitts | H04W 48/04 |
| | | | 455/419 |
| 2018/0354529 A1 | 12/2018 | Ota | |
| 2020/0090203 A1* | 3/2020 | Reichenbach | B60R 16/0234 |
| 2023/0219591 A1* | 7/2023 | Sumikawa | B60W 50/14 |
| | | | 340/438 |

* cited by examiner

FIG. 2

| DRIVER ATTRIBUTE INFORMATION | DRIVER'S AGE | ELDERLY | THRESHOLD: LARGER | DATA TYPES: FEWER |
| --- | --- | --- | --- | --- |
| | TIME AFTER DRIVER HAS OBTAINED LICENSE | LONGER ↔ SHORTER | THRESHOLD: SMALLER ↔ THRESHOLD: LARGER | DATA TYPES: MORE ↔ DATA TYPES: FEWER |
| | DRIVING FREQUENCY | HIGHER ↔ LOWER | THRESHOLD: SMALLER ↔ THRESHOLD: LARGER | DATA TYPES: MORE ↔ DATA TYPES: FEWER |
| | BLANK PERIOD | LONGER | THRESHOLD: LARGER | DATA TYPES: FEWER |

FIG. 3
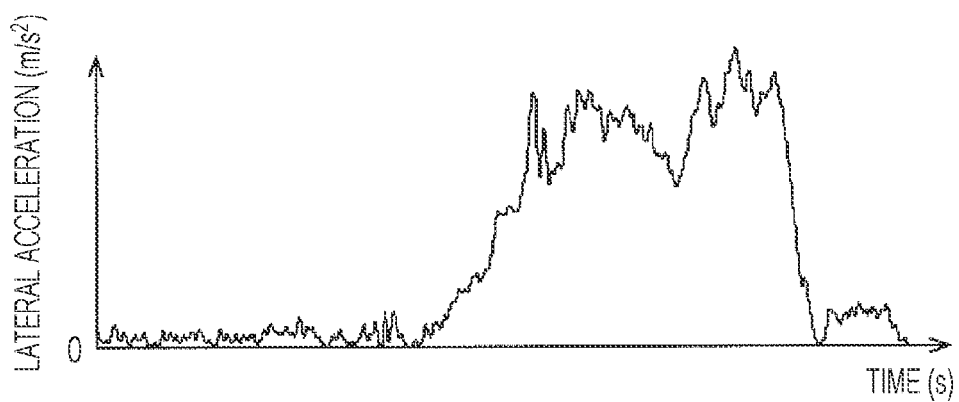
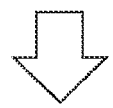
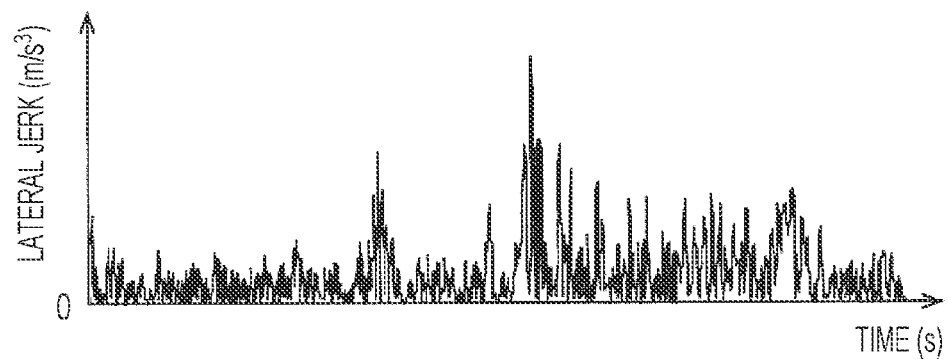
FIG. 4
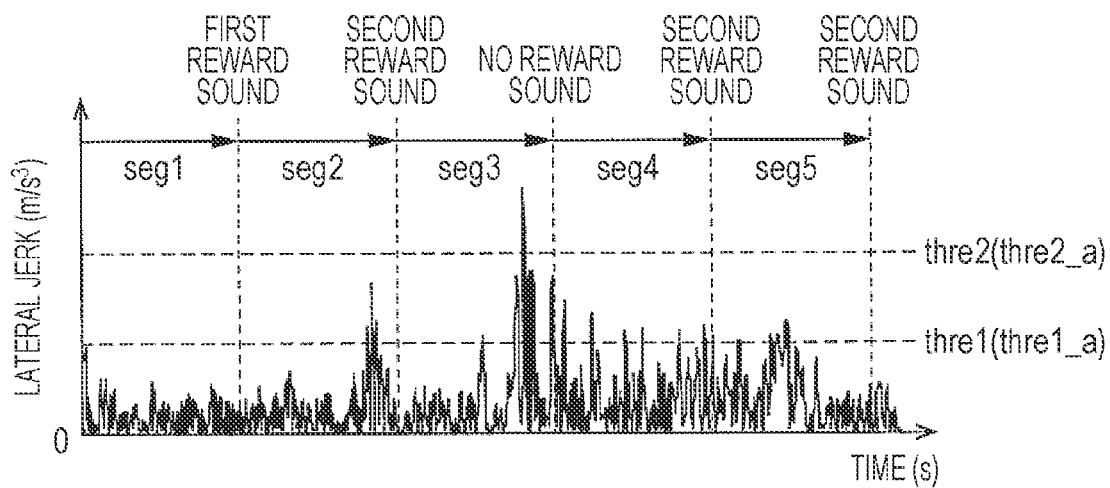

| REWARD SOUND | FIRST REWARD SOUND | SECOND REWARD SOUND |
|---|---|---|
| MEDAL SOUND | GETTING TWO MEDALS | GETTING ONE MEDAL |
| APPLAUSE SOUND | MULTIPLE PEOPLE APPLAUDING | ONE PERSON APPLAUDING |
| FIREWORKS SOUND | SETTING OFF MULTIPLE FIREWORKS | SETTING OFF ONE FIREWORK |
| CHORD | FIVE SOUND NOTES | THREE SOUND NOTES |

DRIVING SUPPORT APPARATUS

CROSS-REFERENCE TO RELATED APPLICATIONS

The present application claims priority from Japanese Patent Application No. 2020-162296 filed on Sep. 28, 2020, the entire contents of which are hereby incorporated by reference.

BACKGROUND

The disclosure relates to a driving support apparatus that assists a driver in improving driver performance.

Driver performance is different among drivers and influences ride comfort and road safety. Various devices have thus been proposed to judge driver performance and give judging results and some advice to a driver.

Japanese Unexamined Patent Application Publication (JP-A) No. 2012-198344 discloses a driving support apparatus that judges driver performance with high precision and informs a driver of the total performance evaluation each time the driver drives so as to assist the driver in improving performance for the next time. This driving support apparatus includes an acceleration change calculator, a jerk calculator, a performance judger, and a total performance judger. The acceleration change calculator calculates a first correlation value correlated to an amount of change in the acceleration.

The jerk calculator calculates a second correlation value correlated to a jerk. The performance judger judges from the first and second correlation values whether the driver performance regarding the driving that the driver has just done is smooth or jerky, based on preset judgement criteria using a vibration model. The total performance judger calculates a score for the judgement result determined by the performance judger. The total performance judger then divides this score by the number of times the performance judger has made a judgement about this performance so as to calculate a first evaluation index. The total performance judger then calculates a total evaluation score for this performance, based on the first evaluation index.

SUMMARY

An aspect of the disclosure provides a driving support apparatus including a controller. While a vehicle is driving, the controller is configured to obtain data indicating behavior of a body of a vehicle while the vehicle is driving and output a certain sound based on information indicating stability of the behavior determined from the obtained data. Every time the vehicle drives a predetermined segment, the controller is configured to output a reward sound in accordance with the stability of the behavior in the predetermined segment.

An aspect of the disclosure provides a driving support apparatus including circuitry. While a vehicle is driving, the circuitry is configured to obtain data indicating behavior of a body of a vehicle while the vehicle is driving and output a certain sound based on information indicating stability of the behavior determined from the obtained data. Every time the vehicle drives a predetermined segment, the circuitry is configured to output a reward sound in accordance with the stability of the behavior in the predetermined segment.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 2 illustrates an example of an approach to setting conditions by the driving support apparatus of the embodiment;

FIG. 3 is graphs illustrating an example of data processing executed by the driving support apparatus of the embodiment;

FIG. 4 is a graph illustrating an example of sound conversion processing executed by the driving support apparatus of the embodiment;

DETAILED DESCRIPTION

Figure 1:
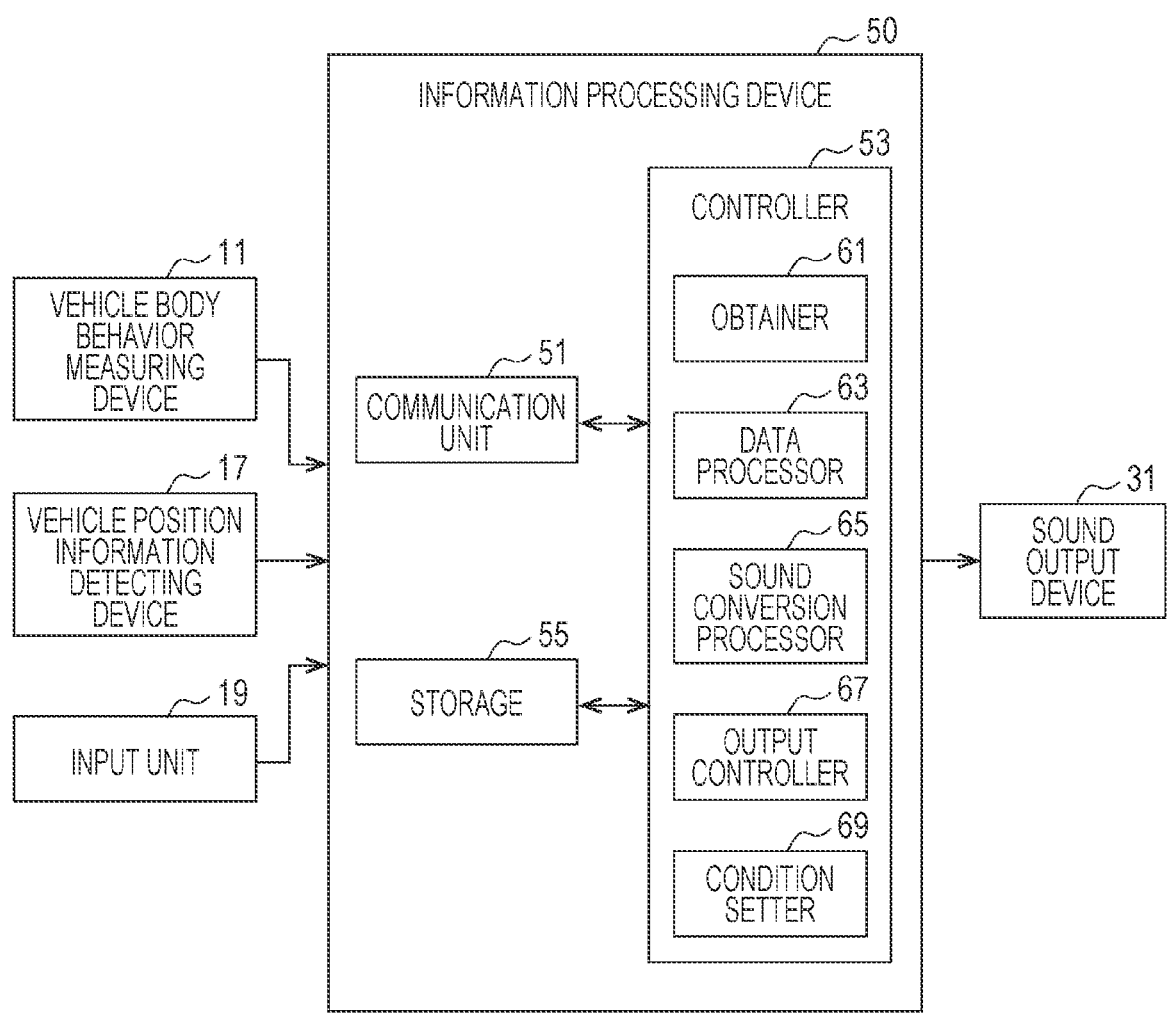
FIG. 1 is a block diagram illustrating an example of the configuration of a driving support apparatus according to an embodiment of the disclosure.

The driving support apparatus disclosed in JP-A No. 2012-198344 evaluates the overall driver performance regarding the driving that a driver has just done. It is thus difficult for the driver to understand at which particular driving time point the performance has been evaluated. To address this issue, an evaluation result or advice about driver performance may be given to a driver in text as an image or voice while the driver is driving. In this case, however, the driver may be distracted from driving while checking the evaluation result or the advice.

It is desirable to provide a driving support apparatus that allows a driver to be informed of driver performance evaluation in real time during driving without being seriously distracted from driving.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Overview of Driving Support Apparatus

An overview of a driving support apparatus according to the embodiment will first be given below. While a vehicle is driving, the driving support apparatus obtains data indicating behavior of the vehicle body and outputs a certain sound based on information indicating the stability of the behavior determined from the obtained data. The behavior of the vehicle body reflects steering, accelerating, and braking operations of a driver, for example. The driver is thus able to intuitively understand the driver performance evaluation in real time via auditory stimulation.

Every time the vehicle drives a predetermined segment, the driving support apparatus of the embodiment outputs a reward sound in accordance with the stability of the behavior of the vehicle body in this segment. This enables the driver to intuitively understand the driver performance evaluation in the predetermined segment in real time via auditory stimulation. If the behavior of the vehicle body is stabilized in the predetermined segment, the driving support apparatus provides performance evaluation to a driver as a reward sound. This can boost driver's motivation to maintain high performance.

The driving support apparatus according to the embodiment will be described below through illustration of an example.

2. Configuration of Driving Support Apparatus

The configuration of a driving support apparatus 1 will be first discussed below. FIG. 1 is a block diagram illustrating an example of the configuration of the driving support apparatus 1 according to the embodiment.

The driving support apparatus 1 includes an information processing device 50. The information processing device 50 is constituted by a processor, such as a central processing unit (CPU), electric circuitry, and storage elements such as a random access memory (RAM) and a read only memory (ROM). The entirety or part of the information processing device 50 may be software that can be updated, such as firmware, or may be a program module that is executed in response to an instruction from the CPU.

The driving support apparatus 1 also includes a vehicle body behavior measuring device 11, a vehicle position information detecting device 17, an input unit 19, and a sound output device 31. The vehicle body behavior measuring device 11, the vehicle position information detecting device 17, the input unit 19, and the sound output device 31 are coupled to the information processing device 50 directly or via a communication bus, such as a controller area network (CAN), so that they can communicate with the information processing device 50.

(2-1. Vehicle Body Behavior Measuring Device)

The vehicle body behavior measuring device 11 measures data indicating behavior of a vehicle body. The vehicle body behavior measuring device 11 includes at least one of a vehicle velocity sensor, an acceleration sensor, or an angular velocity sensor. The vehicle velocity sensor detects the rotational speed of a drive shaft of the vehicle, for example. The acceleration sensor at least detects the longitudinal acceleration, which is the acceleration in the front-back direction of the vehicle body, and the lateral acceleration in the widthwise direction of the vehicle body. The acceleration sensor may also detect the vertical acceleration, which is the acceleration in the height direction of the vehicle body. The angular velocity sensor detects a rate of change of each of the longitudinal axial angle (roll angle) in the front-back direction of the vehicle body, the transverse axial angle (pitch angle) in the widthwise direction of the vehicle body, and the vertical axial angle (yaw angle) of the height direction of the vehicle body. The angular velocity sensor may be a yaw rate sensor that detects a rate of change of the yaw angle.

Data measured by the vehicle body behavior measuring device 11 is subject to change in response to steering, accelerating, and braking operations of a driver. The data is input into the information processing device 50 as vehicle body behavior data. The information processing device 50 is thus able to obtain information indicating data measured by the vehicle body behavior measuring device 11. The vehicle body behavior measuring device 11 may include a sensor other than a vehicle velocity sensor, an acceleration sensor, and an angular velocity sensor to measure data indicating behavior of the vehicle body.

(2-2. Vehicle Position Information Detecting Device)

The vehicle position information detecting device 17 receives a positioning signal transmitted from a global navigation satellite system (GNSS), which is a typical example of a global positioning system (GPS), and measures the position of the vehicle. The vehicle position information detecting device 17 may receive a positioning signal from another system, such as the quasi-zenith satellite system, in addition to or instead of the GNSS, and measure the position of the vehicle. Information about the position of the vehicle detected by the vehicle position information detecting device 17 is input into the information processing device 50. The information processing device 50 is thus able to obtain position information indicating the position of the vehicle detected by the vehicle position information detecting device 17.

(2-3. Input Unit)

The input unit 19 receives an input operation from a user and sends information about the input operation to the information processing device 50. The input unit 19 may be a touchscreen display or a dial-control operation device. The input unit 19 may be a voice recognition system that receives input of voice of a driver or a passenger or an image recognition system that receives input of a gesture of a driver or a passenger.

In the embodiment, the input unit 19 receives input of information about attributes of a driver. The information about attributes of a driver is information related to the driving skills of the driver and indicates at least one of the driver's age, how long the driver has driven after getting the license, how often the driver drives, or how long the driver has not driven since he/she did last time (blank period). Another information from which the driving skills of the driver can be estimated may be included. These items of information may be input by the driver answering questions in a form of a questionnaire presented by the information processing device 50. Alternatively, these items of information may be obtained and stored in advance and be input into the information processing device 50.

The input unit 19 may also receive input of information about a sound to be output. For example, a user driver may be able to select a desirable sound from various sound types or tones, such as musical instrument sounds and sound effects, presented by the information processing device 50. Sound data is stored in a storage 55 of the information processing device and may be updated or added as a result of the driving support apparatus 1 communicating with an external server, for example.

(2-4. Sound Output Device)

The sound output device 31 outputs a sound that can be recognized by a driver. The sound output device 31 may be a speaker installed in the vehicle or a speaker dedicated to the driving support apparatus 1. The sound output device 31 outputs a sound under the control of the information processing device 50 and allows a driver to identify driver performance evaluation via auditory stimulation.

(2-5. Information Processing Device)

The information processing device 50 includes a communication unit 51, a controller 53, and a storage 55. The controller 53 includes an obtainer 61, a data processor 63, a sound conversion processor 65, an output controller 67, and a condition setter 69. The controller 53 is a processor, such as a CPU. The obtainer 61, the data processor 63, the sound conversion processor 65, the output controller 67, and the condition setter 69 may be functions implemented as a result of the processor executing a program.

(2-5-1. Storage)

The storage 55 includes one or multiple storage elements, such as a RAM and a ROM. The storage 55 stores obtained data and calculation result data, as well as a program executed by the controller 53 and various parameters used for executing the program.

(2-5-2. Communication Unit)

The communication unit 51 is an interface for sending and receiving data and signals to and from the vehicle body behavior measuring device 11, the vehicle position information detecting device 17, the input unit 19, and the sound output device 31.

(2-5-3. Obtainer)

The obtainer 61 of the controller 53 obtains information output from the vehicle body behavior measuring device 11, the vehicle position information detecting device 17, and the input unit 19 via the communication unit 51. An example of information obtained by the obtainer 61 is data indicating behavior of the vehicle body output from the vehicle body behavior measuring device 11. The obtainer 61 obtains data at predetermined intervals and stores the obtained data in the storage 55.

(2-5-4. Data Processor)

The data processor 63 of the controller 53 executes certain data processing on vehicle body behavior data obtained by the obtainer 61. In one example, the data processor 63 executes at least one of smoothing processing, absolute value conversion processing, or time derivative processing on measurement data indicating at least one of the vehicle velocity, acceleration (longitudinal acceleration, lateral acceleration, and vertical acceleration), or angular velocity (angular velocity of yaw angle, roll angle, and pitch angle), so as to calculate an index value, which is a value representing the magnitude of the behavior of the vehicle body.

For example, the data processor 63 executes smoothing processing, absolute value conversion processing, and time derivative processing on measurement data indicating at least one of the vehicle velocity, acceleration, or angular velocity so as to calculate the absolute value of at least one of the acceleration, a jerk (snap or jounce), or a jerk of angular velocity (which is also called angular acceleration). The calculated absolute value of at least one of the acceleration, angular velocity, a jerk, or angular acceleration is used as the index value representing the magnitude of the behavior of the vehicle body. Among others, using the absolute value of at least one of a jerk or angular acceleration as the index value can reduce the influence of a route of the vehicle, acceleration and deceleration of another vehicle on a change in the acceleration or angular velocity. This makes it possible to more accurately evaluate a change of the behavior of the vehicle body based on the driver performance.

The data processor 63 may calculate one index value by using plural items of data selected from the absolute values of acceleration, angular velocity, a jerk, and angular acceleration. In this case, the data processor 63 may convert individual items of data to be used to values represented by the same index (value of 0 to 100, for example) and determine the average of the converted values as the index value.

In the embodiment, the data processor 63 uses the number (type) of data which is set by the condition setter 69 based on driving conditions of the vehicle and calculates one index value or the same number of index values as the used items of data. Details of setting of items of data by the condition setter 69 will be discussed later.

Regarding the acceleration and a jerk, the index value is calculated for each of at least one of the longitudinal acceleration, lateral acceleration, or vertical acceleration. Regarding the angular velocity and angular acceleration, the index value is calculated for each of at least one of the yaw angle, roll angle, or pitch angle. The index value calculated by the data processor 63 becomes larger as the magnitude of the behavior of the vehicle body is greater, and becomes smaller as the magnitude of the behavior of the vehicle body is smaller.

(2-5-5. Sound Conversion Processor)

Every time the vehicle drives a predetermined segment, the sound conversion processor 65 of the controller 53 calculates information indicating the stability of the behavior of the vehicle body (hereinafter may also be simply called the behavior stability), based on the index value calculated by the data processor 63 from data measured in this segment. The sound conversion processor 65 then converts the calculated information into information indicating a sound to be output.

The above-described predetermined segment, which serves as the unit for calculating an evaluation value, may be a segment based on a predetermined driving distance or a segment based on a predetermined driving time. The predetermined segment may alternatively be a segment between adjacent crossroads where traffic lights are installed. The sound conversion processor evaluates the behavior stability in each predetermined segment and outputs a reward sound in accordance with the evaluated behavior stability. A reward sound is output in each predetermined segment so that a driver can feel a higher sense of accomplishment as the behavior stability is higher. This can induce the driver to improve driver performance so that the behavior of the vehicle body can be more stable.

The predetermined segment may be a specific segment set in advance. For example, to evaluate the stability of the steering operation of a driver, a segment which continues to be straight for a certain distance or longer or a segment which continues to curve at a certain curvature may be used as the predetermined segment. To evaluate the acceleration or braking operation of a driver, a segment which continues to be straight for a certain distance or longer may be used as the predetermined segment. A judgement as to whether the vehicle has driven such a specific segment may be made based on position information of the vehicle detected by the vehicle position information detecting device 17 and map data of a navigation system.

In one example, every time the vehicle drives a predetermined segment, the sound conversion processor 65 compares the highest index value in this segment with a predetermined threshold set by the condition setter 69 so as to evaluate the stability of the behavior of the vehicle body, and sets an output sound in accordance with the behavior stability. This can evaluate the behavior stability based on the index value about the time when the vehicle body has become most unstable while driving this segment. In this case, as the highest index value, which is the absolute value of at least one of the acceleration, angular velocity, a jerk, or angular acceleration, is smaller, the behavior stability is judged to be higher.

The threshold for evaluating the behavior stability may be a variable value based on the driving skills of the driver. As the threshold is smaller, the magnitude of the behavior of the vehicle body is expected to be smaller to improve the behavior stability. This induces the driver to make an effort to improve driver performance so that the behavior of the vehicle body can be more stable. As the threshold, one threshold or multiple thresholds may be used. If one threshold is used, the behavior stability is judged in the following manner. When the highest index value is smaller than or equal to the threshold, the behavior stability is judged to be high. When the highest index value exceeds the threshold, the behavior stability is judged to be low. When two thresholds (first and second thresholds) are used, the behavior stability is judged in the following manner. When the highest index value is smaller than or equal to the first threshold, which is smaller than the second threshold, the behavior stability is judged to be high. When the highest index value exceeds the first threshold and is smaller than or equal to the second threshold, which is larger than the first threshold, the behavior stability is judged to be intermediate. When the highest index value exceeds the second threshold, the behavior stability is judged to be low.

Every time the vehicle drives a predetermined segment, the sound conversion processor 65 may compare the index value calculated for this segment with the predetermined threshold set by the condition setter 69. The sound conversion processor 65 may then set the number of times that the index value exceeds the threshold to be the evaluation value indicating the behavior stability and determine a sound to be output in accordance with the evaluation value. Using the number of times that the index value exceeds the threshold as the evaluation value can evaluate the behavior stability in the entire segment as a whole, unlike when the index value that exceeds the threshold only one time during driving in this segment is used as the evaluation value.

As discussed above, the evaluation value may indicate the number of times that the index value, which is the absolute value of at least one of the acceleration, angular velocity, a jerk, or angular acceleration, exceeds the threshold. As this evaluation value is smaller, the behavior stability is judged to be higher. In one example, the behavior stability is judged in the following manner. When the number of times that the index value exceeds the threshold is 0, the behavior stability is judged to be high. When the number of times that the index value exceeds the threshold is 1 to 3, the behavior stability is judged to be intermediate. When the number of times that the index value exceeds the threshold is 4 or greater, the behavior stability is judged to be low. The threshold may be a variable value based on the driving skills of a driver. As the threshold is smaller, the magnitude of the behavior of the vehicle body is expected to be smaller to improve the behavior stability. This induces the driver to make an effort to improve driver performance so that the behavior of the vehicle body can be more stable. The number of times that the index value exceeds the threshold, which is used as a reference to determine the level of behavior stability, may also be changed based on the driving skills of a driver.

An approach to setting a threshold for evaluating the behavior stability based on the driving skills of a driver will be discussed later in detail when an explanation of the condition setter 69 is given.

A reward sound to be output is a sound that makes a driver feel a higher sense of accomplishment as the behavior stability is higher, and varies in accordance with the behavior stability or the evaluation value. A reward sound may be a sound that makes a driver feel comfortable, for example, a sound effect, such as a sound of a driver receiving a medal (hereinafter such a sound will be called a medal sound), an applause sound, a fireworks sound, or a chord consisting of multiple sound notes of different pitches or different tones.

For example, if the reward sound is a medal sound, as the behavior stability is higher, more medals are given to the driver. The medal sound may be an impact sound, such as a sound of a metal coin dropped on the hard floor. If the reward sound is an applause sound, as the behavior stability is higher, more people applaud. If the reward sound is a fireworks sound, as the behavior stability is higher, more fireworks are set off. If the reward sound is a chord, as the behavior stability is higher, a chord consisting of more notes is output.

The reward sound is not limited to the above-described examples. In addition to or instead of changing the number of medals, applauding people, fireworks, and notes forming a chord, the volume or the pitch of a reward sound may be changed. In this case, as the behavior stability is higher, the volume is set to be higher or the pitch is set to be lower, which can make a driver feel a higher sense of accomplishment. If the reward sound is a medal sound, an applause sound, or a fireworks sound, the tempo of an output sound may be changed. In this case, as the behavior stability is higher, the tempo becomes quicker, which can make a driver feel a higher sense of accomplishment. If the reward sound is a chord, a concord is set when the behavior stability is high. When the behavior stability is low, a discord is set by lowering or raising at least one of the notes forming the chord by a half step.

If plural items of data selected from the acceleration, angular velocity, a jerk, and angular acceleration are used to evaluate the behavior stability, the sound conversion processor 65 may use the index values of the plural items of data to evaluate the stability levels of the corresponding individual behavior patterns. In this case, the sound conversion processor 65 may compare each index value with the threshold, determine the behavior stability for each index value, combine the evaluation results of the index values, and then set the number of medals, applauding people, fireworks, or notes forming a chord. Alternatively, the threshold and the type of reward sound may be set for each of the plural items of data. In this case, the sound conversion processor 65 may set an output sound for each of the plural items of data, based on the relationship between the index value for a corresponding item of data and the threshold, and output an individual reward sound.

A reward sound may be output based on the evaluation result of each of the behavior of the vehicle body in the front-back direction and that in the left-right direction. This enables the driver to individually recognize the behavior stability determined from driver performance in the front-back direction and that in the left-right direction of the vehicle body.

As described above, the sound conversion processor 65 sets a sound tone or a sound type selected by a user driver to that of a reward sound to be output, determines the level of behavior stability based on the index value calculated by the data processor 63, and then sets a reward sound based on the level of behavior stability. As a result, the index value calculated by the data processor 63 can be converted into information indicating an output sound.

If a high level of behavior stability in each segment continues over multiple segments, the sound conversion processor 65 may generate a sound effect different from a regular reward sound. This can boost driver's motivation to maintain high performance so that the behavior stability can be kept stable. For example, when the number of continuous segments in which the index value calculated by the data processor 63 does not exceed the threshold has reached a preset number, the sound conversion processor 65 generates a sound effect together with or instead of a reward sound. The sound effect may be a sound, such as a fanfare sound, which can make a driver feel a higher sense of accomplishment than a reward sound does.

If the sound conversion processor 65 calculates the behavior stability or the evaluation value using one threshold, every time the number of continuous segments in which the index value calculated from measurement data in each segment does not exceed this threshold has reached a preset number, the sound conversion processor 65 generates a predetermined sound effect. If the sound conversion processor 65 calculates the behavior stability or the evaluation value using plural thresholds, every time the number of continuous segments in which the index value calculated from measurement data in each segment does not exceed the highest threshold has reached a preset number, the sound conversion processor 65 generates a predetermined sound effect. Alternatively, different sound effects may be set for plural thresholds, and, for each of the plural thresholds, every time the number of continuous segments in which the index value does not exceed a corresponding threshold has reached a preset number, the sound conversion processor 65 may generate the predetermined sound effect.

(2-5-6. Output Controller)

The output controller 67 of the controller 53 controls the driving of the sound output device 31, based on information indicating an output sound calculated by the sound conversion processor 65, and drives the sound output device 31 to output a reward sound. In the embodiment, every time a vehicle has driven a predetermined segment, the output controller 67 causes the sound output device 31 to output a reward sound tone or type set by the sound conversion processor 65 in accordance with the level of behavior stability.

(2-5-7. Condition Setter)

The condition setter 69 of the controller 53 sets a condition for sound conversion processing to be executed by the sound conversion processor 65. In the embodiment, the condition setter 69 sets a threshold for evaluating the behavior stability, based on information about driver's attributes input via the input unit 19.

In one example, based on information related to driver's driving skills obtained as information about driver's attributes, the condition setter 69 sets a smaller threshold value as the driving skills estimated from the driver's attributes are higher and sets a greater threshold value as the driving skills are lower. With this setting, for a driver having high driving skills to make the behavior of the vehicle body stable, the threshold is lowered. To output the same reward sound, a higher level of behavior stability is expected for this driver than for a driver having lower driving skills.

This can induce the driver having high driving skills to improve driver performance so that the behavior of the vehicle body can be more stable. Conversely, for a driver having low driving skills, the threshold is increased. This can induce this driver to drive at a suitably stable level in accordance with his/her driving skills.

As information about driver's attributes related to driver's driving skills, at least one of the driver's age, how long the driver has driven after getting the license, how often the driver drives, or how long the driver has not driven since he/she did last time (blank period), which is obtained via the input unit 19, is used. If the driver's age is high, the driving skills are likely to have deteriorated, and the threshold value is increased. As the time after the driver has obtained the license is longer, the driving skills are likely to be higher, and the threshold value is decreased. As the driver drives more frequently, the driving skills are likely to be higher, and the threshold value is decreased. As the time after the driver drove last time (blank period) is longer, the driving skills are more likely to have deteriorated, and the threshold value is increased.

In addition to the information obtained via the input unit 19, the condition setter 69 may use data about the past behavior stability of the driver to adjust the threshold. For example, the condition setter 69 may use information about the number of times or the frequency with which the index value calculated by the data processor 63 exceeds the threshold during the past driving time of this driver. In this case, as the number of times or the frequency with which the index value exceeds the threshold is smaller, the driving skills of this driver are likely to be higher, and the threshold value is decreased. The condition setter 69 may use information about the past evaluation result of the behavior stability determined for this driver by the sound conversion processor 65. In this case, as the level of the evaluation result is higher, the driving skills are likely to be higher, and the threshold value is decreased.

The condition setter 69 may change the number of thresholds, based on information about driver's attributes from which the driver's driving skills can be estimated. In this case, as the driver's driving skills are higher, more thresholds are used. As more thresholds are used, the behavior stability can be presented to the driver in greater details.

In the embodiment, the condition setter 69 may also set a condition for data processing to be executed by the data processor 63, based on information about driver's attributes. In one example, based on the information about driver's attributes, the condition setter 69 sets the number of data types to be used by the data processor 63 to calculate the index value representing the magnitude of the behavior of the vehicle body.

For example, as the driving skills which can be estimated from the driver's attributes are higher, the condition setter 69 increases the number of data types used for calculating the index value, and as the driving skills are lower, the condition setter 69 decreases the number of data types. With this setting, for a driver having high driving skills to make the behavior of the vehicle body stable, driver performance is evaluated based on more data types. This can induce this driver to improve driver performance so that the behavior of the vehicle body can be more stable. Conversely, for a driver having low driving skills, driver performance is evaluated based on fewer data types. This can induce this driver to drive at a suitably stable level in accordance with his/her driving skills.

In this manner, the condition setter 69 may adjust the number of data types to be used for calculating the index value by the data processor 63. Even in this case, regardless of the number of data types to be used, the use of data about a jerk of lateral acceleration or the angular acceleration of yaw angle is prioritized. This makes it easier to evaluate the steering operation of a driver. The use of data about a jerk of longitudinal acceleration or the angular acceleration of roll angle may be prioritized. This makes it easier to evaluate the accelerating or braking operation of a driver.

FIG. 2 illustrates examples of the approach to setting thresholds and to adjusting the number of data types used for calculating an index value, based on information about driver's attributes.

As is seen from FIG. 2, when the driver's age exceeds a preset age (when the driver is elderly), the threshold value is increased by a certain amount and the number of data types used for calculating the index value is decreased. As the time after the driver has obtained the license is longer, the threshold value becomes smaller by a preset number and the number of data types used for calculating the index value becomes larger. Conversely, as the time after the driver has obtained the license is shorter, the threshold value becomes larger by a preset number and the number of data types used for calculating the index value becomes smaller.

As the driver drives more frequently, the threshold value becomes smaller by a preset number and the number of data types used for calculating the index value becomes larger. Conversely, as the driver drives less frequently, the threshold value becomes larger by a preset number and the number of data types used for calculating the index value becomes smaller. As the time after the driver drove last time (blank period) is longer, the threshold value becomes larger by a preset number and the number of data types used for calculating the index value becomes smaller.

If the behavior stability is evaluated with first and second thresholds (first threshold<second threshold), the condition setter 69 increases or decreases a reference value, which is set for each of the first and second thresholds, and the number of data types, based on information about the driver's attributes. For example, if the index value is calculated as 0 to 100, the reference value of the first threshold may be set to be 30, and that of the second threshold may be set to be 60. Then, the reference values of the first and second thresholds may be multiplied by a coefficient smaller than 1 or a coefficient greater than 1, based on each item of information about the driver's attributes, so that the first and second thresholds are increased or decreased. The data types that can be used for evaluating the behavior stability may be set to be twelve items of data, such as the longitudinal acceleration, lateral acceleration, vertical acceleration, angular velocity of yaw angle, that of roll angle, that of pitch angle, a jerk of longitudinal acceleration, that of lateral acceleration, that of vertical acceleration, angular acceleration of yaw angle, that of pitch angle, and that of roll angle. Then, the number of data types used as a reference is set to be five and is increased or decreased one by one, based on each item of information about the driver's attributes. However, the threshold value and the number of data types are adjusted within a range between a preset maximum value and a preset minimum value of the threshold value and that of the number of data types. As a result, a condition for data processing to be executed by the data processor 63 and that for sound conversion processing to be executed by the sound conversion processor 65 are set.

The coefficient used for increasing or decreasing the threshold value and the amount by which the number of data types is increased or decreased may be fixed regardless of the driver's attributes or may be weighted in accordance with the driver's attributes.

Data processing, sound conversion processing, and condition setting processing executed by the controller 53 will be described below with reference to FIGS. 3 through 5 through illustration of an example. In the following example, a reward sound is generated in the following manner. A driving segment based on a predetermined driving time is used as the predetermined segment for evaluating the behavior stability. Every time a vehicle drives this predetermined segment, the absolute value of a jerk of lateral acceleration found from data of the measured lateral acceleration is compared with a first threshold thre1 and a second threshold thre2.

FIG. 3 is graphs illustrating an example of data processing executed by the data processor 63, and FIG. 4 is a graph illustrating sound conversion processing executed by the sound conversion processor 65. In the example in FIGS. 3 and 4, the behavior stability is evaluated from the index value of a jerk of lateral acceleration (lateral jerk) determined from measurement data of the lateral acceleration detected by an acceleration sensor, which forms the vehicle body behavior measuring device 11. A reward sound is generated based on the evaluated behavior stability.

As illustrated in FIG. 3, the data processor 63 executes smoothing processing and absolute value conversion processing on the measurement data of the lateral acceleration so as to convert the lateral acceleration into the absolute value thereof. The data processor 63 then executes time derivative processing to convert the lateral acceleration into the absolute value of a jerk of lateral acceleration (lateral jerk). As illustrated in FIG. 4, every time the vehicle drives one of segments seg1 through seg5, the sound conversion processor 65 compares the highest absolute value of a jerk of lateral acceleration (index value) in each of the segments seg1 through seg5 with the first threshold thre1 and the second threshold thre2. The sound conversion processor 65 then sets a reward sound based on the comparison result. In one example, since the highest index value in the first segment seg1 is smaller than or equal to the first threshold thre1, the sound conversion processor 65 sets a first reward sound. In each of the second segment seg2, the fourth segment seg4, and the fifth segment seg5, the highest index value exceeds the first threshold thre1 and is smaller than or equal to the second threshold thre2. The sound conversion processor 65 thus sets a second reward sound. In the third segment seg3, the highest index value exceeds the second threshold thre2, and the sound conversion processor 65 does not output any reward sound.

When the highest index value has exceeded the highest threshold (second threshold thre2 in the example in FIG. 4) while the vehicle is driving a segment, the sound conversion processor 65 may discontinue evaluation processing in this segment and shift to the next segment. In one example, if segments are divided by a predetermined driving time or driving distance, when the index value has exceeded the highest threshold while the vehicle is driving a certain segment, the sound conversion processor 65 may reset counting the driving time or distance in this segment and shift to the next segment. With this arrangement, even if the magnitude of the behavior of the vehicle body is intensified momentarily, after the behavior stability is recovered from such a state and has become high, a reward sound can be output, thereby making a driver feel a sense of accomplishment.

Figures 5, 6:
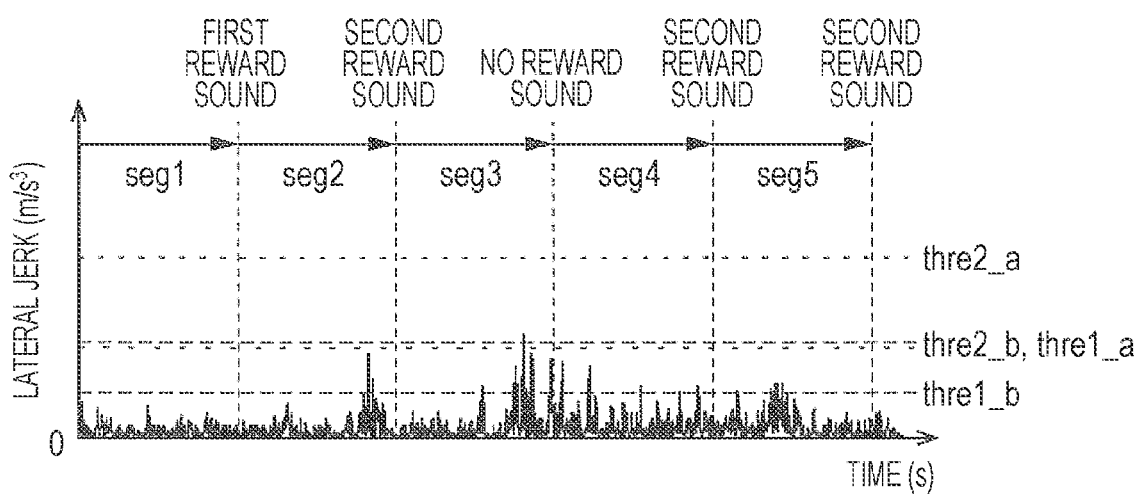
FIG. 5 illustrates setting examples of reward sounds.
FIG. 6 is a graph illustrating an example in which thresholds are changed.

FIG. 5 illustrates setting examples of first and second reward sounds. In the example in FIG. 4, the first reward sound is set when the behavior stability is high, while the second reward sound is set when the behavior stability is intermediate. If the type of reward sound is a medal sound, the first reward sound is a sound of getting two medals, while the second reward sound is a sound of getting one medal. If the type of reward sound is an applause sound, the first reward sound is a sound of multiple people applauding, while the second reward sound is a sound of one person applauding. If the type of reward sound is a fireworks sound, the first reward sound is a sound of setting off multiple fireworks, while the second reward sound is a sound of setting off one firework. If the type of reward sound is a chord, the first reward sound is a chord consisting of five sound notes, while the second reward sound is a chord consisting of three sound notes.

In this manner, the reward sound based on the behavior stability is output. This can make the behavior stability audible, thereby enabling a driver to identify driver performance evaluation in real time during driving without being seriously distracted from driving.

A description will be given, with reference to FIGS. 4 and 6, of an example in which the threshold values are changed in accordance with the driver's driving skills. FIG. 6 is a graph illustrating an example in which the first and second threshold values are decreased in accordance with the driver's driving skills. FIG. 4 illustrates the absolute value of a jerk of lateral acceleration obtained from the performance of a driver having low driving skills. FIG. 6 illustrates the absolute value of a jerk of lateral acceleration obtained from the performance of a driver having high driving skills. The first threshold thre1_a and the second threshold thre2_a in FIG. 6 correspond to the first threshold thre1 and the second threshold thre2 in FIG. 4, respectively.

As illustrated in FIG. 4, regarding the performance of a driver having low driving skills, the absolute value of a jerk of lateral acceleration (index value) is relatively large, and the first threshold thre1_a and the second threshold thre2_a are set to be relatively large values. In contrast, as illustrated in FIG. 6, regarding the performance of a driver having high driving skills, the absolute value of a jerk of lateral acceleration (index value) is relatively small, and the first threshold thre1_b and the second threshold thre2_b are set to be relatively small values. In the example in FIG. 6, the first threshold thre1_b and the second threshold thre2_b are the values obtained by multiplying the first threshold thre1_a and the second threshold thre2_a by 0.5, respectively.

If the first threshold thre1_a and the second threshold thre2_a are applied to the data indicating the absolute value of a jerk of lateral acceleration illustrated in FIG. 6, the reward sounds in the first segment seg1, the second segment seg2, the fourth segment seg4, and the fifth segment seg5 are set to be the first reward sound, while the reward sound in the third segment seg3 is set to be the second reward sound. In contrast, if the first threshold thre1_b and the second threshold thre2_b are applied to the data indicating the absolute value of a jerk of lateral acceleration illustrated in FIG. 6, the reward sound in the first segment seg1 is set to be the first reward sound, the reward sounds in the second, fourth, and fifth segments seg2, seg4, and seg5 are set to be the second reward sound, and no reward sound is output in the third segment seg3. As the driving skills of a driver are higher, a higher level of behavior stability is expected to output the first and second reward sounds. This can induce the driver to achieve even higher driver performance so that the behavior of the vehicle body can be more stable.

In a driving environment where the behavior stability is likely to be lowered, the condition setter 69 may stop outputting sound. For example, in a scene where a vehicle drives on an unpaved road, such as a gravel path, or a scene where a vehicle drives by avoiding other vehicles in traffic congestion, the behavior stability is likely to become lower regardless of the driver's driving skills. The condition setter 69 thus stops outputting sound. This can prevent an inaccurate evaluation from being presented to a driver and also avoid leading a driver to drive unsuitably based on such an inaccurate evaluation. A driving environment where the behavior stability is likely to be lowered can be specified by the condition of a driving road or the number of other vehicles, which can be identified from detection data obtained from an outside imaging camera, a light detection and ranging, laser imaging, detection, and ranging (LiDAR), and a radar sensor, for example. An unpaved road may be detected from a change in the acceleration in the vertical direction of the vehicle body indicated by measurement data input from the vehicle body behavior measuring device 11.

3. Operation of Driving Support Apparatus

Figure 8:
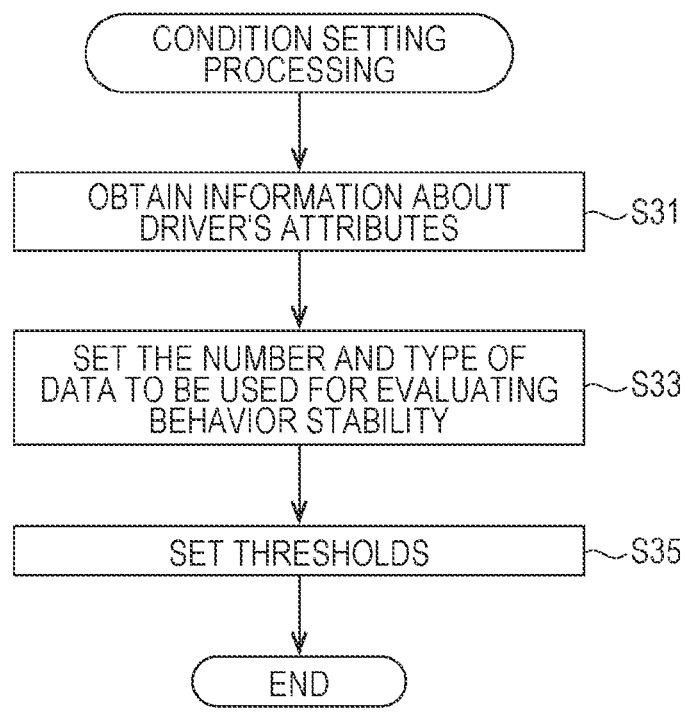
FIG. 8 is a flowchart illustrating condition setting processing executed by the driving support apparatus of the embodiment.
Figure 9:
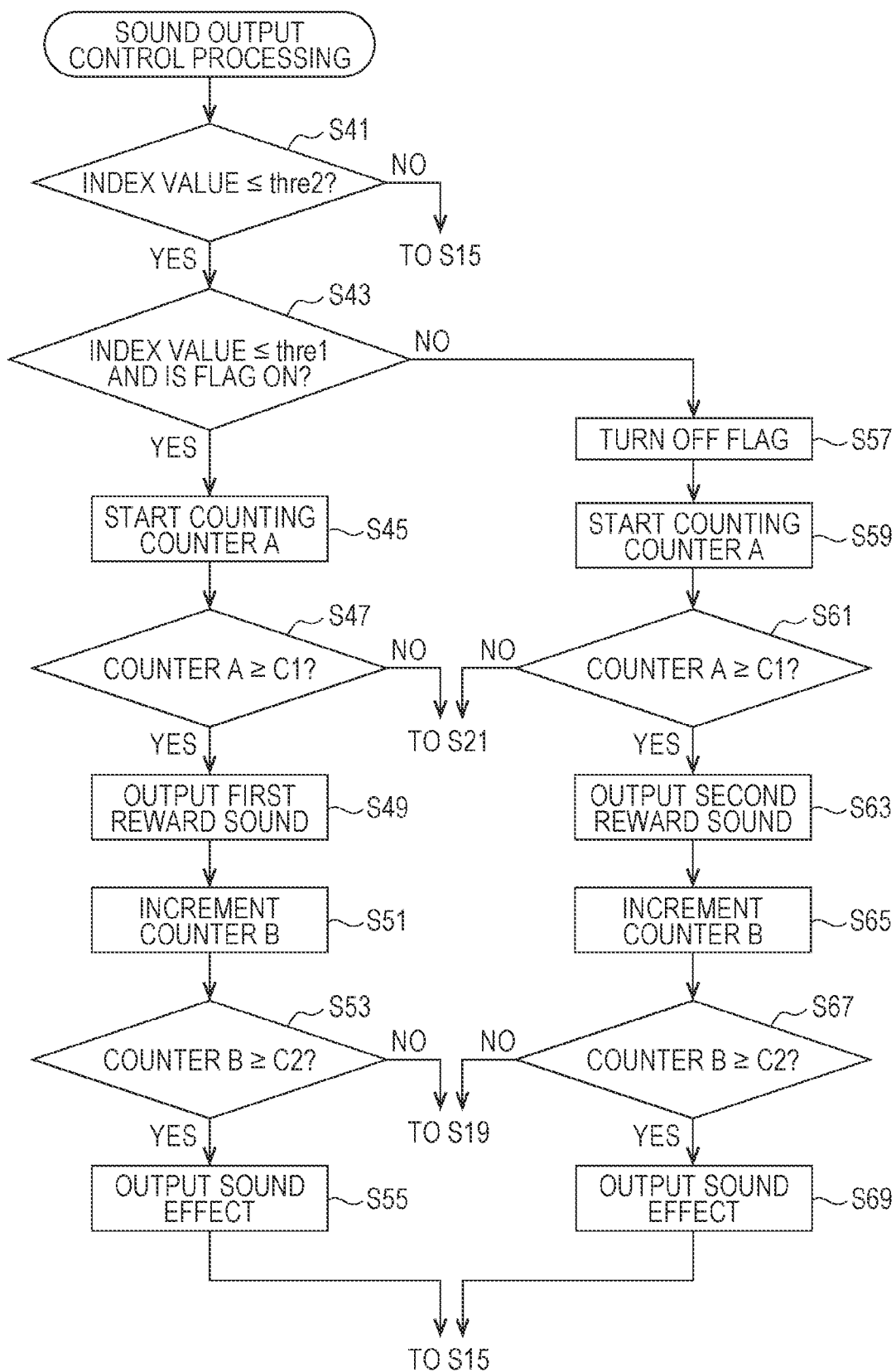
FIG. 9 is a flowchart illustrating sound output control processing executed by the driving support apparatus of the embodiment.

As the operation of the driving support apparatus 1 of the embodiment, an example of control processing executed by the information processing device 50 will be discussed below. FIG. is a flowchart illustrating a main routine of control processing executed by the controller 53 of the information processing device 50. FIG. 8 is a flowchart illustrating a routine of condition setting processing executed by the controller 53. FIG. 9 is a flowchart illustrating sound output control processing executed by the controller 53. In the following example, every time a vehicle drives a predetermined segment based on a preset driving time, the index value is compared with the first threshold thre1 and the second threshold thre2 and a reward sound is generated based on a comparison result.

In step S11, the controller 53 judges whether to start control processing for presenting driver performance evaluation to a driver via auditory stimulation. Hereinafter, such control processing may also be called auditory stimulation control. There is no particular restriction on a condition for starting to execute auditory stimulation control. In one example, if it is determined that auditory stimulation control is constantly executed while a driving system for the vehicle is operating, the controller 53 may judge that auditory stimulation control will start when the driving system is started. In another example, the controller 53 may judge that auditory stimulation control will start when it is detected that a driver has sat in the driver's seat based on an output signal from an in-vehicle imaging camera or a load sensor installed in the driver's seat. If a driver or a passenger is able to switch auditory stimulation control between ON and OFF, the controller 53 may judge that auditory stimulation control will start when a driver or a passenger has switched auditory stimulation control ON.

If the controller 53 has judged that auditory stimulation control will not start (NO in step S11), the controller 53 repeatedly executes step S11. If the controller 53 has judged that auditory stimulation control will start (YES in step S11), the controller 53 executes condition setting processing in step S13.

Condition setting processing will be discussed below in detail with reference to FIG. 8. In step S31, the obtainer 61 obtains information about driver's attributes sent from the input unit 19. For example, the obtainer 61 obtains at least one of items of information about the driver's age, how long the driver has driven after getting the license, how often the driver drives, or how long the driver has not driven since he/she did last time (blank period). These items of information may be input by the driver responding to questions in a form of a questionnaire presented by the information processing device 50. Alternatively, these items of information may be obtained and stored in advance and be input into the information processing device 50. The obtainer 61 may also obtain evaluation data about the past performance of this driver from the storage 55.

Then, in step S33, the condition setter 69 sets the number and the type of data to be used for evaluating the behavior stability, based on the obtained information about driver's attributes. In the embodiment, based on the setting example illustrated in FIG. 2, the condition setter 69 sets the number of data to be used for evaluating the behavior stability. For example, the data items that can be used for evaluating the behavior stability are set to be twelve items of data, such as the longitudinal acceleration, lateral acceleration, vertical acceleration, angular velocity of yaw angle, that of pitch angle, that of roll angle, a jerk of longitudinal acceleration, that of lateral acceleration, that of vertical acceleration, angular acceleration of yaw angle, that of pitch angle, and that of roll angle. From among these items of data, the condition setter 69 sets the number of data items to be used for evaluating the behavior stability.

In the setting example in FIG. 2, based on the information about driver's attributes, as the driver's driving skills are likely to be higher, the number of data items becomes larger, and, as the driver's driving skills are likely to be lower, the number of data items becomes smaller. For example, the condition setter 69 sets the maximum number of data items to be twelve and the minimum number to be one and also sets the reference number to be five. The condition setter 69 then adds or subtracts one to or from five for each item of information about the driver's attributes, thereby determining the number of data items to be used. When determining the number of data items, the condition setter 69 prioritizes the use of data items about a jerk of longitudinal acceleration, a jerk of lateral acceleration, angular acceleration of yaw angle, and angular acceleration of pitch angle, which can reflect driver performance more accurately than the other data items. The condition setter 69 may set data items reflecting the behavior of the vehicle body in either one of the front-back direction and the left-right direction of the vehicle as data items to be used.

Then, in step S35, the condition setter 69 sets the first threshold thre1 and the second threshold thre2, based on the obtained information about driver's attributes. In the embodiment, the condition setter 69 sets the first and second thresholds thre1 and thre2 in accordance with the setting example in FIG. 2. In the embodiment, one index value is calculated using one or plural data items. Hence, individual data items to be used are converted into values represented by the same index (value of 0 to 100, for example), and the average of the converted values is used as the index value. The condition setter 69 sets the reference value of the first threshold thre1 to be 30 and that of the second threshold thre2 to be 60. The condition setter 69 then multiplies each of the reference values of the first and second thresholds thre1 and thre2 by a coefficient smaller than 1 or a coefficient greater than 1, based on each item of the obtained information about driver's attributes, thereby setting the first and second thresholds thre1 and thre2. The approach to determining the index value from multiple data items and that to setting the first and second thresholds thre1 and thre2 are not limited to the above-described examples.

In the setting example in FIG. 2, based on the information about driver's attributes, as the driver's driving skills are likely to be higher, the first and second thresholds thre1 and thre2 are set to be smaller values. Conversely, as the driver's driving skills are likely to be lower, the first and second thresholds thre1 and thre2 are set to be larger values.

Figure 7:
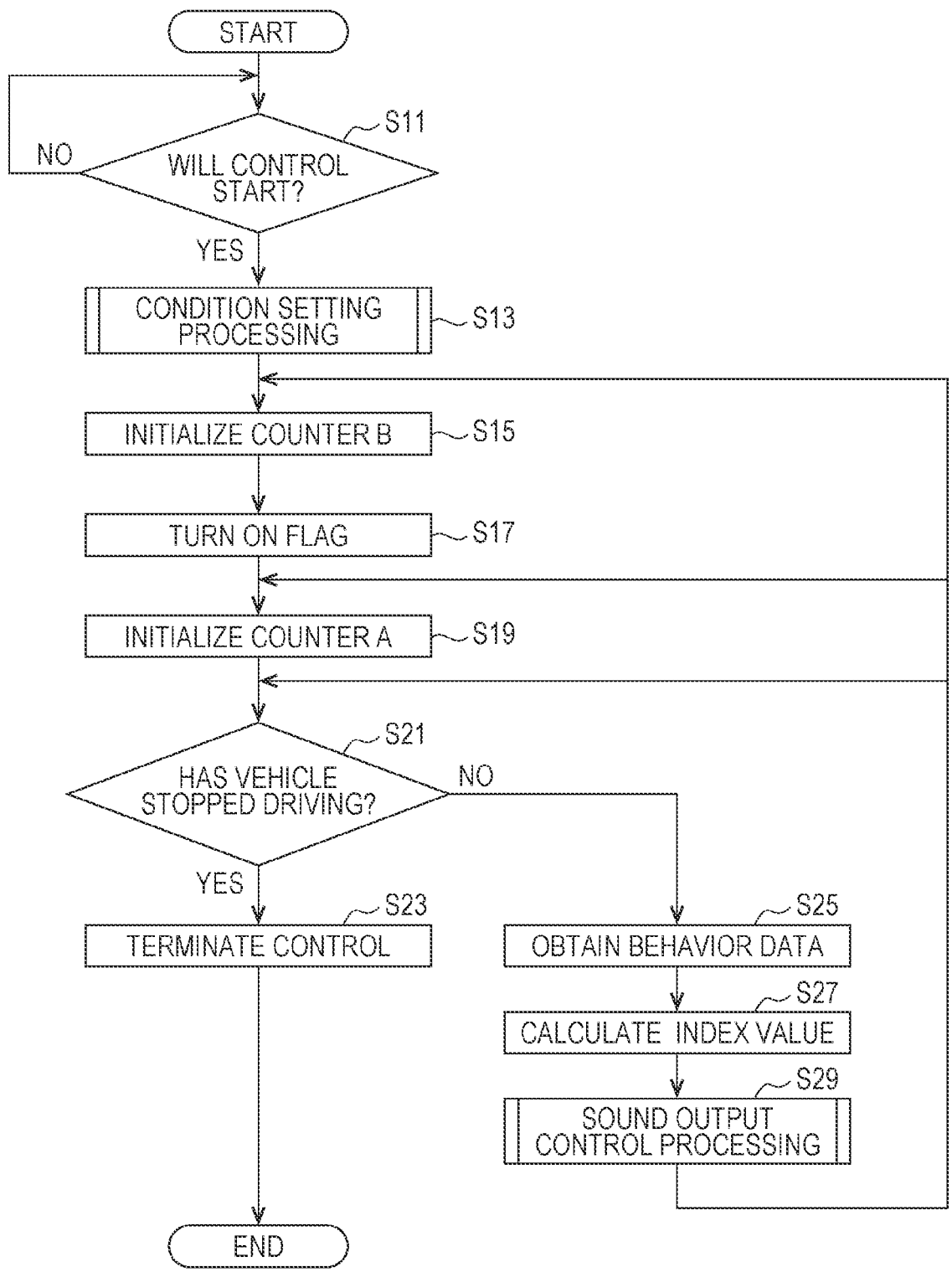
FIG. 7 is a flowchart illustrating control processing executed by the driving support apparatus of the embodiment.

Referring back to FIG. 7, after condition setting processing is executed in step S13, in step S15, the sound conversion processor 65 initializes a counter B for counting the number of continuous segments in which the vehicle stability is at the same level. The number of continuous segments in which the vehicle stability is at the same level may be the number of continuous segments in which the index value is smaller than or equal to the first threshold thre1, the number of continuous segments in which the index value exceeds the first threshold thre1 and is smaller than or equal to the second threshold thre2, or the number of continuous segments in which the index value exceeds the second threshold thre2. If the value of the counter B has reached a preset counter value C2, the sound conversion processor 65 sets a sound effect, such as a fanfare sound, different from a regular reward sound.

Then, in step S17, the sound conversion processor 65 turns ON a flag for identifying whether the index value in each segment exceeds the first threshold thre1. When the flag is ON, it means that the index value does not exceed the first threshold thre1. When the flag is OFF, it means that the index value exceeds the first threshold thre1.

In step S19, the sound conversion processor 65 initializes a counter A for counting the driving time in each segment. If the value of the counter A has reached a preset counter value C1, the sound conversion processor 65 judges that the vehicle has finished driving a predetermined segment.

Then, in step S21, the controller 53 judges whether the vehicle has stopped driving. If the vehicle has stopped driving (YES in step S21), the controller 53 terminates auditory stimulation control in step S23. If the vehicle has not stopped driving (NO in step S21), in step S25, the obtainer obtains data indicating the behavior of the vehicle body sent from the vehicle body behavior measuring device 11. In the embodiment, the obtainer 61 obtains data items about the vehicle velocity, longitudinal acceleration, lateral acceleration, vertical acceleration, angular velocity of roll angle, that of pitch angle, and that of yaw angle.

Then, in step S27, the data processor 63 executes smoothing processing, absolute value conversion processing, and time derivative processing on each item of data obtained by the obtainer 61 so as to calculate the index value representing the magnitude of the behavior of the vehicle body. In step S27, the data processor 63 may execute data processing only on the data items set in condition setting processing in step S13 and calculate the index value. Alternatively, the data processor 63 may execute data processing on all the data items obtained in step S25 and calculate the index value by using only the data items set in condition setting processing in step S13. In the embodiment, the data processor 63 converts individual data items to be used to values represented by the same index (value of 0 to 100, for example) and determines the average of the converted values as the index value.

In step S29, the sound conversion processor 65 executes sound output control processing for converting the calculated index value to information indicating an output sound and outputting the sound.

Sound output control processing executed by the sound conversion processor 65 will be discussed below in detail with reference to FIG. 9. In step S41, the sound conversion processor 65 judges whether the index value calculated by the data processor 63 in step S27 is smaller than or equal to the second threshold thre2. If the index value exceeds the second threshold thre2 (NO in step S41), the sound conversion processor 65 returns to step S15 without switching the flag between ON and OFF or incrementing the counter A nor counter B.

If the index value is smaller than or equal to the second threshold thre2 (YES in step S41), the sound conversion processor 65 judges in step S43 whether the index value is smaller than or equal to the first threshold thre1 and whether the flag is ON. If the index value is smaller than or equal to the first threshold thre1 and if the flag is ON (YES in step S43), the sound conversion processor 65 starts counting the counter A in step S45. The sound conversion processor 65 then judges in step S47 whether the value of the counter A has reached the counter value C1. If the value of the counter A has reached the counter value C1, it means that the vehicle has finished driving a current segment.

If the counter A has not reached the counter value C1 (NO in step S47), that is, if the vehicle has not finished driving the current segment, the controller 53 returns to step S21 and repeats obtaining of measurement data and calculating and evaluating of the index value while the vehicle is driving this segment. If the value of the counter A has reached the counter value C1 (YES in step S47), the sound conversion processor 65 sets the first reward sound in step S49 since the highest index value in this segment is smaller than or equal to the first threshold thre1. Then, the output controller 67 drives the sound output device 31 to issue the first reward sound.

Then, in step S51, the sound conversion processor 65 increments the counter B. The sound conversion processor 65 then judges in step S53 whether the value of the counter B has reached the preset counter value C2. If the value of the counter B has reached the counter value C2 (YES in step S53), it means that the number of continuous segments in which the highest index value is smaller than or equal to the first threshold thre1 has reached a predetermined number (counter value C2).

If the value of the counter B is smaller than the counter value C2 (NO in step S53), the controller 53 returns to step S19 and resets the counter A and executes the subsequent steps. If the value of the counter B has reached the counter value C2 (YES in step S53), in step S55, the sound conversion processor sets the output sound to be a sound effect, such as a fanfare sound, different from a regular reward sound since the number of segments in which the highest index value is smaller than or equal to the first threshold thre1 has reached the predetermined number. Then, the output controller 67 drives the sound output device 31 to issue a sound effect. After a sound effect has been issued, the controller 53 returns to step S15 and resets the counter B and executes the subsequent steps. If it is found in step S43 that the index value exceeds the first threshold thre1 or the flag is OFF (NO in step S43), the sound conversion processor 65 turns OFF the flag in step S57. This indicates that the highest index value in the current segment exceeds the first threshold thre1 and is smaller than or equal to the second threshold thre2. Then, in step S59, the sound conversion processor 65 starts counting the counter A. The sound conversion processor 65 then judges in step S61 whether the value of the counter A has reached the counter value C1. If the value of the counter A has reached the counter value C1, it means that the vehicle has finished driving the current segment.

If the counter A has not reached the counter value C1 (NO in step S61), that is, if the vehicle has not finished driving the current segment, the controller 53 returns to step S21 and repeats obtaining of measurement data and calculating and evaluating of the index value while the vehicle is driving this segment. If the value of the counter A has reached the counter value C1 (YES in step S61), the sound conversion processor 65 sets the second reward sound in step S63 since the highest index value in this segment exceeds the first threshold thre1 and is smaller than or equal to the second threshold thre2. Then, the output controller 67 drives the sound output device 31 to issue the second reward sound.

Then, in step S65, the sound conversion processor 65 increments the counter B. The sound conversion processor 65 then judges in step S67 whether the value of the counter B has reached the preset counter value C2. If the value of the counter B has reached the counter value C2 (YES in step S67), it means that the number of continuous segments in which the highest index value exceeds the first threshold thre1 and is smaller than or equal to the second threshold thre2 has reached a predetermined number (counter value C2).

If the value of the counter B is smaller than the counter value C2 (NO in step S67), the controller 53 returns to step S19 and resets the counter A and executes the subsequent steps. If the value of the counter B has reached the counter value C2 (YES in step S67), in step S69, the sound conversion processor sets the output sound to be a sound effect, such as a fanfare sound, different from a regular reward sound since the number of segments in which the highest index value exceeds the first threshold thre1 and is smaller than or equal to the second threshold thre2 has reached the predetermined number. Then, the output controller 67 drives the sound output device 31 to issue a sound effect.

In one example, the sound effect to be issued in step S69 is different from that in step S55, which is issued when the number of segments in which the highest index value is smaller than or equal to the first threshold thre1 has reached the predetermined number. Outputting different types of sound effects allows the driver to recognize which level of behavior stability has continued a predetermined number of times. After a sound effect has been issued, the controller 53 returns to step S15 and resets the counter B and executes the subsequent steps.

The controller 53 repeats executing the above-described control processing to control outputting of a reward sound in accordance with the behavior stability in each segment until it is judged in step S21 that the vehicle has stopped driving.

4. Advantages of Embodiment

As discussed above, while a vehicle is driving, the driving support apparatus 1 of the embodiment obtains data indicating behavior of the vehicle body, and outputs a certain sound based on information about the behavior stability determined from the obtained data every time the vehicle drives a predetermined segment. This enables the driver to identify driver performance in this segment in real time during driving. The output sound does not include text information to be displayed or to be output as voice. This enables the driver to intuitively understand the content of information about driver performance in this segment via auditory stimulation and to be prevented from being seriously distracted from driving. The output sound is a reward sound that can make the driver feel a sense of accomplishment. This can boost driver's motivation to maintain high performance so that the behavior of the vehicle body can be more stable.

The driving support apparatus 1 of the embodiment may control at least one of a pitch, volume, type, or tempo of a reward sound, or the number of times the reward sound is output, or the number of sound notes forming the reward sound, based on information indicating the behavior stability in the predetermined segment. This enables a driver to intuitively understand the level of behavior stability.

The driving support apparatus 1 of the embodiment may control outputting of a reward sound by using the highest index value found from measurement data obtained during driving in the predetermined segment as information indicating the behavior stability. This can evaluate driver performance based on the magnitude of the behavior about the time when the vehicle body has become most unstable in each segment.

The driving support apparatus 1 of the embodiment may calculate an index value from measurement data obtained during driving in the predetermined segment, and compare the calculated index value with a predetermined threshold. The driving support apparatus 1 may then output a reward sound, based on the number of times that the index value exceeds the predetermined threshold as information indicating the behavior stability. This can evaluate the behavior stability in the entire segment as a whole, unlike when the index value that exceeds the threshold only one time during driving in this segment is used as the evaluation value.

The driving support apparatus 1 of the embodiment may set a threshold based on driver attribute information related to driver's driving skills. In one example, as the driver's driving skills are higher, the threshold is set to be smaller, and, as the driver's driving skills are lower, the threshold is set to be larger. This can induce a driver having high driving skills to improve driver performance so that the behavior of the vehicle body can be more stable. This can also induce a driver having low driving skills to drive at a suitably stable level in accordance with his/her driving skills.

The driving support apparatus 1 of the embodiment may stop executing auditory stimulation control in a driving environment where the stability of behavior of the vehicle body is likely to be lowered. This can prevent an inaccurate evaluation from being presented to a driver and also avoid leading a driver to drive unsuitably based on such an inaccurate evaluation.

While the disclosure has been described through illustration of an embodiment with reference to the drawings, it is to be understood that the disclosure is not limited to this embodiment. Obviously, various modifications and variations will be apparent to those skilled in the art of the disclosure without departing from the technical scope of the claims, and it is to be understood that such modifications and variations are encompassed within the technical scope of the disclosure.

For example, the driving support apparatus 1 may evaluate the behavior stability in the following manner. A driving segment is set in advance to evaluate at least one of the behavior stability in the front-back direction of a vehicle body or that in the left-right direction of the vehicle body. While a vehicle is driving this driving segment, the driving support apparatus 1 calculates some items of data selected from the longitudinal acceleration, a jerk of longitudinal acceleration, angular velocity of pitch angle, angular acceleration of pitch angle, lateral acceleration, a jerk of lateral acceleration, angular velocity of yaw angle, and angular acceleration of yaw angle, and evaluates the stability of the desired behavior. This makes it possible to reduce the load of calculations of the information processing device 50.

As described above, it is possible to allow a driver to be informed of driver performance evaluation in real time during driving without being seriously distracted from driving.

The controller 53 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 53 including the obtainer 61, the data processor 63, the sound conversion processor 65, the output controller 67, and the condition setter 69. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving support apparatus comprising:
   sensors configured to obtain data indicating behavior of a body of a vehicle while the vehicle is traveling on a road, wherein the road is divided into segments based on a predetermined condition; and
   a controller configured to:
      determine that the vehicle enters from a first segment to a second segment subsequent to the first segment;
      in response to determining that the vehicle enters the second segment, obtain the data from the sensors while the vehicle is traveling within the second segment;
      determine that the vehicle enters from the second segment to a third segment subsequent to the second segment; and
      in response to determining that the vehicle enters the third segment, (1) determine stability of the behavior of the vehicle based on the data obtained when the vehicle is traveling within the second segment, and (2) generate a reward sound based on the determined stability of the behavior of the vehicle in the second segment.

2. The driving support apparatus according to claim 1, wherein, based on the determined stability of the behavior, the controller is further configured to control one or more of
   a pitch of the reward sound,
   a volume of the reward sound,
   a type of the reward sound,
   a tempo of the reward sound,
   how many times the reward sound is output, and
   a number of sound notes forming the reward sound.

3. The driving support apparatus according to claim 1, wherein the controller is configured to determine the stability of the behavior by comparing a value representing the behavior in each segment with a threshold value.

4. The driving support apparatus according to claim 2, wherein the controller is configured to determine the stability of the behavior by comparing a value representing the behavior in each segment with a threshold value.

5. The driving support apparatus according to claim 3, wherein the controller is further configured to set the threshold value based on information related to a driving skill of a driver who drives the vehicle.

6. The driving support apparatus according to claim 4, wherein the controller is further configured to set the threshold value based on information related to a driving skill of a driver who drives the vehicle.

7. The driving support apparatus according to claim 1, wherein the controller is further configured to set one or more types of data to be used for determining the stability of the behavior based on information related to a driving skill of a driver who drives the vehicle.

8. The driving support apparatus according to claim 2, wherein the controller is further configured to set one or more types of data to be used for determining the stability of the behavior based on information related to a driving skill of a driver who drives the vehicle.

9. The driving support apparatus according to claim 3, wherein the controller is further configured to set one or more types of data to be used for determining the stability of the behavior based on information related to a driving skill of a driver who drives the vehicle.

10. The driving support apparatus according to claim 4, wherein the controller is further configured to set one or more types of data to be used for determining the stability of the behavior, based on information related to a driving skill of a driver who drives the vehicle.

11. The driving support apparatus according to claim 5, wherein the controller is further configured to set one or more types of data to be used for determining the stability of the behavior, based on information related to the driving skill of the driver.

12. The driving support apparatus according to claim 6, wherein the controller is further configured to set one or more types of data to be used for determining the stability of the behavior, based on information related to the driving skill of the driver.

13. A driving support apparatus comprising:
sensors configured to obtain data indicating behavior of a body of a vehicle while the vehicle is traveling on a road, wherein the road is divided into segments based on a predetermined condition; and
circuitry configured to:
determine that the vehicle enters from a first segment to a second segment subsequent to the first segment;
in response to determining that the vehicle enters the second segment, obtain the data from the sensors while the vehicle is traveling within the second segment;
determine that the vehicle enters from the second segment to a third segment subsequent to the second segment; and
in response to determining that the vehicle enters the third segment, (1) determine stability of the behavior of the vehicle based on the data obtained when the vehicle is traveling within the second segment, and (2) generate a reward sound based on the determined stability of the behavior of the vehicle in the second segment.

14. The driving support apparatus according to claim 1, wherein the controller is further configured to:
in response to determining that the vehicle enters the third segment, in addition to (1) determining stability of the behavior of the vehicle based on the data obtained when the vehicle is traveling within the current segment and (2) generating the reward sound based on the determined stability of the behavior of the vehicle in the second segment, (3) obtain the data from the sensors while the vehicle is traveling within the third segment; and
determine that the vehicle enters from the third segment to a fourth segment subsequent to the third segment; and
in response to determining that the vehicle enters the fourth segment, (1) determine stability of the behavior of the vehicle based on the data obtained when the vehicle is traveling within the third segment, and (2) generate a reward sound based on the determined stability of the behavior of the vehicle in the third segment.

15. The driving support apparatus according to claim 1, wherein the controller is further configured to:
receive information related to a driving skill of a driver who drives the vehicle; and
set a threshold value such that the higher the driving skill of the driver is, the lower the threshold value is set.

16. The driving support apparatus according to claim 15, wherein the higher the driving skill of the driver is, the more types of data the controller is configured to set.

17. The driving support apparatus according to claim 13, wherein the circuitry is further configured to:
in response to determining that the vehicle enters the third segment, in addition to (1) determining stability of the behavior of the vehicle based on the data obtained when the vehicle is traveling within the current segment and (2) generating the reward sound based on the determined stability of the behavior of the vehicle in the second segment, (3) obtain the data from the sensors while the vehicle is traveling within the third segment; and
determine that the vehicle enters from the third segment to a fourth segment subsequent to the third segment; and
in response to determining that the vehicle enters the fourth segment, (1) determine stability of the behavior of the vehicle based on the data obtained when the vehicle is traveling within the third segment, and (2) generate a reward sound based on the determined stability of the behavior of the vehicle in the third segment.

18. The driving support apparatus according to claim 13, wherein the circuitry is further configured to:
receive information related to a driving skill of a driver who drives the vehicle; and
set a threshold value such that the higher the driving skill of the driver is, the lower the threshold value is set.

19. The driving support apparatus according to claim 18, wherein the higher the driving skill of the driver is, the more types of data the circuitry is configured to set.

* * * * *